US010345495B2

(12) United States Patent
Chakraborty et al.

(10) Patent No.: US 10,345,495 B2
(45) Date of Patent: Jul. 9, 2019

(54) STAIN RESISTANT RETROREFLECTIVE ARTICLES

(71) Applicant: 3M INNOVATIVE PROPERTIES COMPANY, St. Paul, MN (US)

(72) Inventors: Ruby Chakraborty, Woodbury, MN (US); Cheryl S. Elsbernd, Woodbury, MN (US); Shri Niwas, Maple Grove, MN (US); Bruce H. Edwards, White Bear Lake, MN (US); Chih-Chung Hsu, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/537,528

(22) PCT Filed: Dec. 28, 2015

(86) PCT No.: PCT/US2015/067723
§ 371 (c)(1),
(2) Date: Jun. 19, 2017

(87) PCT Pub. No.: WO2016/109454
PCT Pub. Date: Jul. 7, 2016

(65) Prior Publication Data
US 2017/0363784 A1    Dec. 21, 2017

Related U.S. Application Data

(60) Provisional application No. 62/098,013, filed on Dec. 30, 2014.

(51) Int. Cl.
*G02B 5/128*    (2006.01)
*B32B 7/12*    (2006.01)
(Continued)

(52) U.S. Cl.
CPC ............... *G02B 5/128* (2013.01); *B32B 7/12* (2013.01); *B32B 15/082* (2013.01); *G02B 5/136* (2013.01);
(Continued)

(58) Field of Classification Search
CPC .......... G02B 5/128; G02B 5/136; B32B 7/12; B32B 15/082; B32B 2327/12; B32B 2333/12; B32B 2551/00
(Continued)

(56) References Cited

U.S. PATENT DOCUMENTS 1,175,224 A    3/1916  Bleecker
2,461,011 A    2/1949  Taylor
(Continued)

FOREIGN PATENT DOCUMENTS

EP    0459720    12/1991
EP    0467570    1/1992
(Continued)

OTHER PUBLICATIONS

International Search Report for PCT International Application No. PCT/US2015/067723, dated Apr. 19, 2016, 4pgs.

*Primary Examiner* — Euncha P Cherry
(74) *Attorney, Agent, or Firm* — Yufeng Dong

(57) ABSTRACT

Retroreflective article and precursor articles formed during the preparation of the retroreflective articles are provided. Also, methods of making both the precursor articles and the retroreflective articles are provided. The retroreflective articles and the precursor articles contain a reflective layer that includes both a reflective metal and a polymeric blend. The polymeric blend includes both a fluorinated polymer and a (meth)acrylate polymer. The retroreflective articles typically have anti-staining properties, anti-corrosion properties, or both.

18 Claims, 5 Drawing Sheets

(51) Int. Cl.
  *B32B 15/082* (2006.01)
  *G02B 5/136* (2006.01)

(52) U.S. Cl.
  CPC ....... *B32B 2327/12* (2013.01); *B32B 2333/12* (2013.01); *B32B 2551/00* (2013.01)

(58) Field of Classification Search
  USPC ......................................................... 359/536
  See application file for complete search history.

(56) References Cited

U.S. PATENT DOCUMENTS

| | | |
|---|---|---|
| 2,726,161 A | 12/1955 | Beck |
| 2,842,446 A | 7/1958 | Beck |
| 2,853,393 A | 9/1958 | Beck |
| 2,870,030 A | 1/1959 | Stradley |
| 2,939,797 A | 6/1960 | Rindone |
| 2,965,921 A | 12/1960 | Bland |
| 2,992,122 A | 7/1961 | Beck |
| 3,468,681 A | 9/1969 | Jaupain |
| 3,946,130 A | 3/1976 | Tung |
| 4,192,576 A | 3/1980 | Tung |
| 4,367,919 A | 1/1983 | Tung |
| 4,564,556 A | 1/1986 | Lange |
| 4,678,695 A | 7/1987 | Tung |
| 4,758,469 A | 7/1988 | Lange |
| 4,772,511 A | 9/1988 | Wood |
| 4,931,414 A | 6/1990 | Wood |
| 5,164,245 A | 11/1992 | Suzuki |
| 5,283,101 A | 2/1994 | Li |
| 5,474,827 A | 12/1995 | Crandall |
| 5,714,223 A | 2/1998 | Araki |
| 5,812,317 A | 9/1998 | Billingsley |
| 5,824,390 A | 10/1998 | Ochi |
| 5,976,669 A | 11/1999 | Fleming |
| 6,110,558 A | 8/2000 | Billingsley |
| 6,172,810 B1 | 1/2001 | Fleming |
| 6,355,302 B1 | 3/2002 | Vandenberg |
| 6,361,850 B1 | 3/2002 | Billingsley |
| 7,695,147 B2 * | 4/2010 | Lee ................ G02B 5/128 359/534 |
| 7,723,452 B2 | 5/2010 | Hooftman |
| 8,414,957 B2 | 4/2013 | Enzerink |
| 2004/0191481 A1 | 9/2004 | Erb |
| 2011/0236648 A1 | 9/2011 | Condon |
| 2014/0060230 A1 | 3/2014 | Nagayama |
| 2014/0247491 A1 | 9/2014 | Zhang |

FOREIGN PATENT DOCUMENTS

| | | |
|---|---|---|
| WO | WO 2005-098125 | 10/2005 |
| WO | WO 2015-061065 | 4/2015 |

* cited by examiner

STAIN RESISTANT RETROREFLECTIVE ARTICLES

CROSS REFERENCE TO RELATED APPLICATIONS

This application is a national stage filing under 35 U.S.C. 371 of PCT/US2015/067723, filed Dec. 28, 2015, which claims the benefit of U.S. Application No. 62/098,013, filed Dec. 30, 2014, the disclosure of which is incorporated by reference in its/their entirety herein.

FIELD OF THE DISCLOSURE

This disclosure relates to retroreflective articles, precursor articles made during the formation of retroreflective articles, and methods of making both the precursor articles and the retroreflective articles.

BACKGROUND

A wide variety of articles that incorporate the phenomenon of retroreflectivity have been developed for a wide variety of uses. Retroreflective articles have the ability to return a substantial portion of incident light back towards the light source. This unique ability has promoted widespread use of retroreflective safety articles. Besides traffic and warning signs and the like, a wide variety of clothing and similar articles such as backpacks, and the like have incorporated retroreflective articles into them. Persons who work or exercise near motor vehicle traffic need to be conspicuously visible so that they do not get struck by passing motor vehicles. When retroreflective articles are worn, the retroreflectivity highlights a person's presence by retroreflecting light from motor vehicle headlamps.

Retroreflective articles typically have an optical lens element layer, a polymeric binder layer (which is often referred to as a bead bond layer), a reflective layer, and may also have a substrate layer. The optical lens elements commonly are microspheres that are partially embedded in the polymeric binder layer. The reflective layer typically is aluminum, silver, or a dielectric mirror that usually is disposed on the embedded portions of the microspheres. Light striking the front surface of the retroreflective article passes through the microspheres and is reflected by the reflective layer to re-enter the microspheres where the light's direction is then altered to travel back towards the light source. Thus, for example, when a vehicle's headlamps strike a retroreflective article, some of the light from the headlamps is reflected back to the driver of the vehicle.

It is generally not necessary, or even desirable, that an entire worn article be retroreflective, so retroreflective appliqués are often used. These retroreflective appliqués can then be attached to an article of clothing or other article to prepare a retroreflective article. In some instances, retroreflective appliqués have been made by partially embedding a microsphere layer in a thermoplastic carrier web, applying a reflective material over the microspheres' protruding portions, and then forming a binder layer (i.e., bead bond layer) over the coated microspheres. Often a pressure sensitive adhesive is applied on the binder layer's back surface, and a release liner is placed over the adhesive until the appliqué is secured to a substrate. The completed appliqué (also sometimes referred to as a transfer sheet) is supplied to a garment assembler in this form, and the garment assembler secures the appliqué to an article of clothing by removing the release liner and adhering the appliqué to an outer surface of the article of clothing. The carrier is then separated from the appliqué to expose the microspheres so that the appliqué can retroreflect light.

In order to decrease the susceptibility of retroreflective articles to corrosion and/or staining and improve durability and launderability, a number of techniques have been disclosed such as, for example, the techniques described in U.S. Pat. No. 4,678,695 (Tung et al.), U.S. Pat. No. 5,824,390 (Ochi et al.), U.S. Pat. No. 5,474,827 (Crandall et al.), U.S. Pat. No. 5,812,317 (Billingsley et al.), U.S. Pat. No. 7,723,452 (Hooftman et al.), U.S. Pat. No. 6,172,810 (Fleming et al.), U.S. Pat. No. 6,355,302 (Vandenberg et al.), and US Patent Application Publication No. 2004/0191481 A1 (Erb et al.).

SUMMARY

Retroreflective article and precursor articles formed during the preparation of the retroreflective articles are provided. Also, methods of making both the precursor articles and the retroreflective articles are provided. The retroreflective articles and the precursor articles contain a reflective layer that includes both a reflective metal and a polymeric blend. The polymeric blend includes both a fluorinated polymer and a (meth)acrylate polymer. The retroreflective articles typically have anti-staining properties, anti-corrosion properties, or both.

In one aspect, an article is provided that includes a bead bond layer, an array of multiple transparent microspheres, and a reflective layer containing a reflective metal and a polymeric blend comprising a fluorinated polymer and a (meth)acrylate polymer. The transparent microspheres in the array have a first portion that is embedded in a first major surface of the bead bond layer and a second portion protruding from the first major surface of the bead bond layer. The reflective layer has a buried region disposed between the bead bond layer and the first portion of the transparent microspheres, and an interstitial region disposed on the first major surface of the bead bond layer between the transparent microspheres. In some embodiments, the article further includes a thermoplastic carrier layer, wherein the second portion of the transparent microspheres are partially embedded in the thermoplastic carrier layer.

In another aspect, a method is provided for preparing an article. The method includes providing a thermoplastic carrier layer having a first major surface. The method further includes partially embedding an array of multiple transparent microspheres into the first major surface of the thermoplastic carrier layer, wherein the transparent microspheres have a first portion that protrudes from the thermoplastic carrier layer and a second portion that is embedded into the thermoplastic carrier layer. The method still further includes providing a reflective layer on the first portion of the transparent microspheres and on an interstitial region of the first major surface of the thermoplastic carrier layer between the multiple transparent microspheres, wherein the reflective layer comprises a reflective metal and a polymeric blend comprising a fluorinated polymer and a (meth)acrylate polymer. Additionally, the method includes applying a bead bond composition to form a bead bond layer adjacent to the reflective layer opposite the thermoplastic carrier layer, wherein the first portion of the transparent microspheres and a buried region of the reflective layer that is on the first portion of the transparent microspheres are embedded into the bead bond layer and wherein the bead bond layer adheres to an interstitial region of the reflective layer between the multiple transparent microspheres. In some embodiments, the method further includes removing the thermoplastic carrier layer, wherein both the buried region and the interstitial region of the reflective layer remain attached to the bead bond layer.

Figure 1:
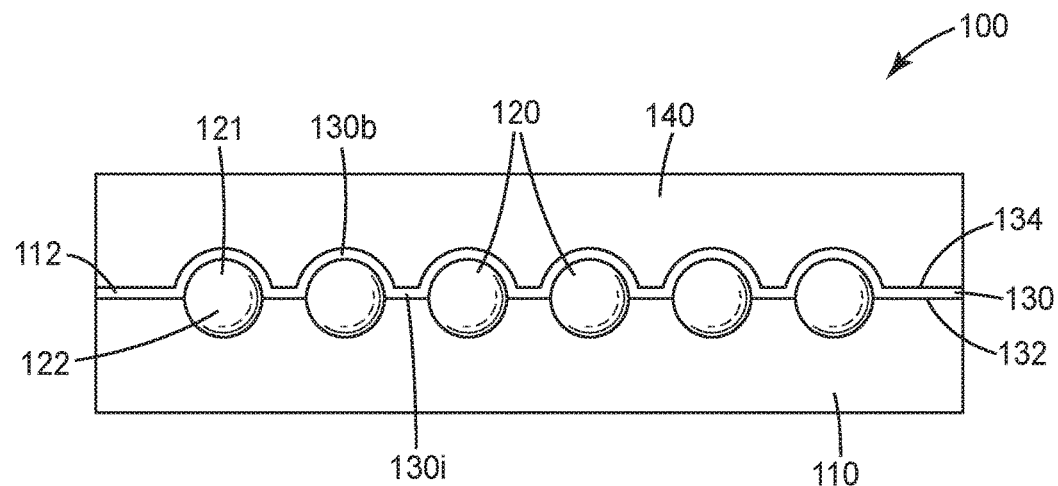
FIG. 1 shows a cross-sectional view of one embodiment of a precursor article that is formed in the process of preparing a retroreflective article.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The desirable safety features associated with retroreflective articles has increased demand for such articles. In some applications, an entire article may be made retroreflective; in others, a portion of the article may be made retroreflective through the use of one or more retroreflective appliqués. Retroreflective articles can include an optical element layer, a polymeric binder layer (typically called a bead bond layer), and a reflective layer. An optical element layer can include optical elements such as, for example, microspheres that are partially embedded in the bead bond layer. That is, the bead bond layer functions to hold to microspheres in a particular location and configuration within the article. A reflective layer can usually be disposed on the embedded portions of the microspheres. That is, the reflective layer is positioned between the partially embedded microspheres and the bead bond layer. In some embodiments, the reflective layer can be a reflective metal layer such as, for example, an aluminum layer, a silver layer, etc. In some embodiments, the reflective layer can be a dielectric mirror layer. Light striking the front surface of the retroreflective article passes through the microspheres and is reflected by the reflective layer to re-enter the microspheres where the light's direction is then altered to travel back towards the light source. Thus, for example, when a vehicle's headlamps strike a retroreflective article, some of the light from the headlamps is reflected back to the driver of the vehicle. This permits the driver of the vehicle to be aware of the person wearing the retroreflective article long before the driver would see the person if he or she were not wearing the retroreflective article. These retroreflective articles and appliqués can be attached to a wide range of articles, including everything from bicycles and motorized vehicles to a wide range of clothing such as jackets, vests, shirts, shoes, hats, and the like.

Retroreflective articles are provided that advantageously can effectively reduce or prevent chemically induced staining and/or corrosion. More specifically, a retroreflective article is provided that includes a bead bond layer, an array of multiple transparent microspheres, and a reflective layer containing a reflective metal and a polymeric blend comprising a fluorinated polymer and a (meth)acrylate polymer. The multiple microspheres in the array have a first portion that are embedded in a first major surface of the bead bond layer and a second portion protruding from the first major surface of the bead bond layer. The reflective layer has a buried region disposed between the bead bond layer and the first portion of the transparent microspheres (i.e., the buried region can be considered to be embedded into the bead bond layer along with the first portion of the multiple microspheres) and an interstitial region disposed on the first major surface of the bead bond layer between the multiple transparent microspheres. The bead bond layer adheres to the interstitial region of the reflective layer and to the buried region of the reflective layer.

A precursor article also is provided that is a formed in the process of preparing a retroreflective article. The precursor article has all of the layers described above for the retroreflective article plus a thermoplastic carrier layer. The second portion of the multiple transparent microspheres in the array are partially embedded in the thermoplastic carrier layer. That is, in the precursor article, the transparent microspheres are partially embedded in the bead bond layer and partially embedded in the thermoplastic carrier layer. Removal of the thermoplastic carrier layer results in the formation of the retroreflective article. When the thermoplastic carrier layer is removed, the reflective layer (both the interstitial region and the buried region) remain adhered to the bead bond layer.

As used herein, the term "precursor article" refers to an article that includes a bead bond layer, a reflective layer (which contains both a reflective metal and a polymeric blend of a fluorinated polymer and a (meth)acrylate polymer), an array of multiple transparent microspheres, and a thermoplastic carrier layer. Any article that may be formed in the process of preparing the precursor article is referred to herein as an "intermediate article". The intermediate article does not include the bead bond layer.

As used herein, the term "retroreflective article" refers to an article that contains a bead bond layer, a reflective layer (which contains both a reflective metal and a polymeric blend of a fluorinated polymer and a (meth)acrylate polymer), and an array of multiple transparent microspheres but that does not include a thermoplastic carrier layer. Precursor articles typically can be converted to retroreflective articles by removal of the thermoplastic carrier layer.

The terms "microspheres", "transparent microspheres", "multiple microspheres", "multiple transparent microspheres" are used interchangeably herein.

When referring to a first part of the microspheres being partially embedded in the bead bond layer or to a second part of the microspheres being partially embedded in the thermoplastic carrier layer, this means that all or most of the microspheres are partially embedded in the bead bond layer or that all or most of the microspheres are partially embedded in the thermoplastic carrier layer. It is not meant to suggest that some of that certain a fraction of the microspheres are embedded and that another fraction of the microspheres are not embedded. The term "partially embedded" means that the microspheres are embedded to a certain depth that is less than the diameter of the microspheres. For example, the microspheres are embedded to a depth up to 30 percent, up to 40 percent, up to 50 percent, up to 60 percent, or up to 70 percent of their diameter. Similarly, when saying that a first portion of the microspheres are embedded, the first portion can be up to 30 percent, up to 40 percent, up to 50 percent, up to 60 percent, or up to 70 percent of their diameter. Likewise, when saying that a second portion of the microspheres are embedded, the second portion can be up 30 percent, up to 40 percent, up to 50 percent, up to 60 percent, or up to 70 percent of their diameter. The depth to which the microspheres are embedded is sufficient to hold them in position.

Both the precursor article and the retroreflective article can be prepared in a multi-step process that involves the formation of various intermediate articles. The process typically includes providing a thermoplastic carrier layer having a first major surface and partially embedding an array of transparent microspheres into the first major surface of the thermoplastic carrier layer. The multiple transparent microspheres in the array have a first portion that protrudes from the thermoplastic carrier layer and a second portion that are embedded into the thermoplastic carrier layer. The process still further includes providing a reflective layer on the first portion of the transparent microspheres and on an interstitial region of the first major surface of the thermoplastic carrier layer between the multiple transparent microspheres, wherein the reflective layer comprises a reflective metal and a polymeric blend. The polymeric blend includes both (a) a fluorinated polymer and (b) a (meth)acrylate polymer. Additionally, the process includes applying a bead bond composition to form a bead bond layer adjacent to the reflective layer opposite the thermoplastic carrier, wherein the first portion of the transparent microspheres and a buried region of the reflective layer positioned on the first portion of the transparent microspheres are embedded into the bead bond layer and wherein the bead bond layer adheres to the reflective layer in an interstitial region of the reflective layer between the multiple microspheres in the array. This process result in the formation of the precursor article. The thermoplastic carrier layer can be removed from the precursor article to form the retroreflective article, wherein the reflective layer (both the interstitial region of the reflective layer and the buried region of the reflective layer) remains attached to the bead bond layer. If desired, a transfer adhesive and/or a fabric can be adhered to the bead bond layer of the precursor article and/or of the retroreflective article.

Unless otherwise indicated, the terms "transparent' and "optically transparent" are used interchangeably and refer to an article, film, microspheres, polymeric blend, or adhesive that has a high light transmittance (e.g., at least 70 percent such as at least 80 percent, at least 85 percent, at least 90 percent, at least 95 percent, at least 97 percent, at least 98 percent, or at least 99 percent) over at least a portion of the visible light spectrum (about 400 to about 700 nanometers (nm)). In many embodiments, the high transmittance is over the entire visible light spectrum.

As used herein, the term "polymer" refers to a polymeric material that is a homopolymer, copolymer, terpolymer, or the like. As used herein, the term "homopolymer" refers to a polymeric material that is the reaction product of a single monomer. As used herein, the term "copolymer" refers to a polymeric material that is the reaction product of two different monomers and the term "terpolymer" refers to a polymeric material that is the reaction product of three different monomers.

As used herein the term "thermoplastic" refers to a polymeric material that melts and/or flows upon the application of heat and then solidifies upon cooling. Thermoplastic materials typically undergo a physical change but no appreciable chemical change upon heating and cooling.

FIG. 1 shows a cross-sectional view of one embodiment of a precursor article of this disclosure. In FIG. 1, an article 100 includes a thermoplastic carrier layer 110, with an array of multiple transparent microspheres 120 partially embedded into a first major surface 112 thereof. That is, a first portion 121 of the transparent microspheres 120 protrudes from the thermoplastic carrier layer 110 and a second portion 122 of the transparent microspheres 120 are embedded into the thermoplastic carrier layer 110. A reflective layer 130 is positioned adjacent to the transparent microspheres 120 (i.e., to the first portion 121 of the microspheres that protrude from the thermoplastic carrier layer 110) and to an interstitial region of the thermoplastic carrier layer 110 that lies between the transparent microspheres 120.

The reflective layer 130 includes both a reflective metal material and a polymeric blend that includes (a) a fluorinated polymer and (b) a (meth)acrylate polymer. The portion 130*i* of the reflective layer 130 that is located between the transparent microspheres 120 is referred to as the "interstitial region" of the reflective layer. A bead bond layer 140 covers the reflective layer 130. The portion 130*b* of the reflective layer 130 is buried between the transparent microspheres 120 and the bead bond layer 140 and is referred to as "buried region" of the reflective layer. The reflective layer 130 has a first major surface 132 on the side of the thermoplastic carrier layer 110, and a second, opposite major surface 134 on the side of the bead bond layer 140. In the precursor article of FIG. 1, the transparent microspheres 120 are embedded in both the thermoplastic carrier layer 110 and in the bead bond layer 140. The reflective layer 130 contacts and adheres to the bead bond layer 140 across the article (in both the buried region 130*b* and in the interstitial region 130*i*) and contacts the thermoplastic carrier layer 110 in the interstitial region 130*i*. The buried region 130*b* is positioned between the first portion 121 of the transparent microspheres 120 and the bead bond layer 140.

Figure 2:
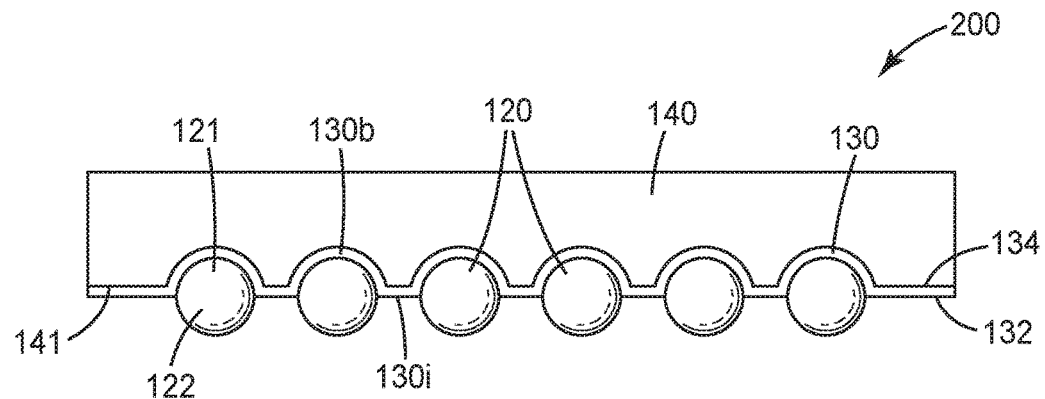
FIG. 2 shows a cross-sectional view of one embodiment of a retroreflective article.

The precursor article of FIG. 1 can be converted to the final retroreflective article by removal of the thermoplastic carrier layer 110. This removal can be carried out in a variety of ways, for example, manually or mechanically. FIG. 2 shows a cross-sectional view of an embodiment of a retroreflective article 200 and corresponds to the precursor article of FIG. 1 in which the thermoplastic carrier layer 110 has been removed.

In FIG. 2, the article 200 includes the multiple transparent microspheres 120 embedded in a first major surface 141 of the bead bond layer 140. The reflective layer 130 is positioned between the bead bond layer 140 and the transparent microspheres 120 and between the bead bond layer 140 and the thermoplastic carrier film 110 (see FIG. 1). The reflective layer 130 includes the buried region 130*b* that is positioned between the bead bond layer 140 and the transparent microspheres 120 (the first portion 121 of the microspheres) and the interstitial region 130*i* that is positioned between the transparent microspheres 120. The interstitial region 130*i* contacts both the bead bond layer 140 and the thermoplastic carrier layer 110. Upon removal of the thermoplastic carrier layer 110 of FIG. 1 to form article 200, the second portion 122 of the transparent microspheres 120 are exposed as well as the interstitial region 130*i* of the reflective layer 130. Upon removal of the thermoplastic carrier layer 110, the interstitial region of the reflective layer remains in contact with (and adhered to) the bead bond layer 140. Also, the transparent microspheres 120 and the buried region 130b of the reflective layer remain embedded in the bead bond layer.

A first surface 132 of the reflective layer 130 includes a surface of the buried region 130b that is in contact with the portion of the microspheres (the first portion 121) embedded in the bead bond layer 140 and a surface of the interstitial region 130i that is now exposed. If not treated with the polymeric blend described herein, the exposed interstitial regions 130i may be vulnerable to corrosion, for example, when the retroreflective article 200 is exposed to sweat or other fluids. Exposure to sweat or other fluids can result in corrosion or discoloration in the absence of the polymeric blend included in the reflective layer 130. Stated differently, the interstitial regions 130i of the retroreflective articles of FIG. 2 are strengthened by the presence of the polymeric blend and tend to be less susceptible to corrosion and/or staining than comparative reflective layers prepared only with a metal layer. A second surface 134 of the reflective layer 130 contacts the bead bond layer 140 throughout.

The reflective layer 130 includes both a reflective metal and the polymeric blend that includes (a) a fluorinated polymer and (b) a (meth)acrylate polymer. While both the reflective metal and the polymeric blend are included in the reflective layer, they may not be both uniformly distributed throughout the reflective layer. The reflective metal is typically positioned in both the buried region 130b and in the interstitial region 130i. In many embodiments, the amount of reflective metal is fairly uniform throughout the reflective layer. That is, the amount of reflective metal (e.g., thickness and percent coverage) in the buried regions 130b and in the interstitial regions 130i are similar. In contrast, the polymeric blend may be more concentrated in the interstitial regions 130i than in the buried regions 130b.

In some embodiments, the reflective metal in the reflective layer is porous. The pores can have any suitable size and can have an average pore diameter ranging from less than 1 nanometer to 100 nanometers or more. For example, the reflective metal can be polycrystalline and can have grains such as column-shaped grains and grain boundaries. These grain boundaries can function as pores. Some of the polymeric blend may reside in the pores and/or grain boundaries of the reflective metal.

The polymeric blend included in the reflective layer 130 contains a fluorinated polymer. As used herein, the term "fluorinated polymer" refers to a polymeric material having at least one fluorine atom. The fluorinated polymer can be a homopolymer, copolymer, terpolymer, and the like. The fluorinated polymer is often amorphous or semi-crystalline. In some embodiments, the fluorinated polymer is rubbery. The fluorinated polymer can have any suitable molecular weight that allows dissolution in an organic solvent. At least at the time of deposition to form the reflective layer, the fluorinated polymer is not crosslinked.

In many embodiments, the fluorinated polymer is prepared from ethylenically unsaturated monomers and at least one of the monomers used to form the fluorinated polymer is a "fluorinated monomer", which refers to an ethylenically unsaturated monomer having at least one fluorine atom. Examples of fluorinated monomers include, but are not limited to, vinylidene fluoride, tetrafluoroethylene, chlorotrifluoroethylene, monofluoroethylene, hexafluoropropylene, and fluoroalkyl vinyl ethers such as those having fluoroalkyl groups with 1 to 5 carbon atoms. Monomers are selected so that the resulting fluorinated polymer is transparent (at least 70 percent, at least 75 percent, at least 80 percent, at least 85 percent, at least 90 percent, at least 95 percent, at least 97 percent, at least 98 percent, or at least 99 percent transparent) to light in the visible region of the electromagnetic spectrum (e.g., 400 nanometers to 700 nanometers). This transparency is needed so that neither the incoming light striking the retroreflective article nor the reflected light is absorbed to a significant extent by the polymeric blend included in the reflective layer.

Some exemplary fluorinated polymers are poly(vinylidene fluoride) or are prepared from a monomer mixture that includes vinylidene fluoride. The monomer mixture often contains at least one second fluorinated monomer. The at least one second fluorinated monomer is often selected from tetrafluoroethylene, chlorotrifluoroethylene, monofluoroethylene, hexafluoropropylene, and fluoroalkyl vinyl ethers such as those having fluoroalkyl groups with 1 to 5 carbon atoms. A plurality of different second fluorinated monomers can be used.

For example, some fluorinated polymers are formed from a monomer mixture containing 30 to 90 weight percent vinylidene fluoride and 10 to 70 weight percent of the second fluorinated monomer. The weight percent values are based on a total weight of monomer in the monomer mixture. The amounts of each monomer are selected so that the resulting fluorinated polymer is amorphous or semi-crystalline. The presence of the vinylidene fluoride can improve compatibility of the fluorinated polymer with the (meth)acrylate polymer in the polymeric blend.

In some more specific examples, the monomer mixture contains 30 to 80 weight percent vinylidene fluorine and 20 to 70 weight percent of the second fluorinated monomer, 30 to 70 weight percent vinylidene fluoride and 30 to 70 weight percent of the second fluorinated monomer, 30 to 60 weight percent vinylidene fluoride and 40 to 70 weight percent of the second fluorinated monomer, 40 to 80 weight percent vinylidene fluoride and 20 to 60 weight percent of the second fluorinated monomer, 40 to 70 weight percent vinylidene fluoride and 30 to 60 weight percent of the second fluorinated monomer, or 50 to 70 weight percent vinylidene fluoride and 30 to 50 weight percent of the second fluorinated monomer. The weight percent values are based on a total weight of monomer in the monomer mixture.

Example fluorinated polymers are commercially available from 3M Company (Saint Paul, Minn., USA) under the trade designations KEL-F (e.g., KEL-F 3700), which are copolymers of vinylidene fluoride and chlorotrifluoroethylene, and FLUOREL, which are copolymers of vinylidene fluoride and hexafluoropropylene. Other example fluorinated polymers are commercially available under the trade designation THV, which are terpolymers of tetrafluoroethylene, hexafluoropropylene, and vinylidene fluoride.

The fluorinated polymer typically does not have a silyl group (e.g., the fluorinated polymer is typically not a fluorinated silane). Unlike a fluorinated silane that can react with a surface to form various pendant groups from the surface, the polymeric blend typically forms a film on a surface. A film may be able to provide better protection of a surface against corrosion and/or staining compared with a surface protected with various pendant groups. That is, the film can be continuous over the surface.

The fluorinated polymer is blended with a (meth)acrylate polymer within the reflective layer. The (meth)acrylate polymer typically is added to enhance the film forming characteristics of the polymeric blend and/or to increase the adhesion of the reflective layer to the other components of the retroreflective article (e.g., to the microspheres and to the bead bond layer). As used herein, the term "(meth)acrylate polymer" refers to a polymer formed from one or more (meth)acrylate esters, which can be methacrylate esters, acrylate esters, or both. Often, at least 50 weight percent of the monomers used to form the (meth)acrylate polymer are an alkyl (meth)acrylate having an alkyl group with 1 to 10 carbon atoms, 1 to 6 carbon atoms, or 1 to 4 carbon atoms. In some embodiments, at least 60 weight percent, at least 70 weight percent, at least 80 weight percent, or at least 90 weight percent of the monomers used to form the (meth)acrylate polymer are alkyl (meth)acrylates having an alkyl group with 1 to 10 carbon atoms, 1 to 6 carbon atoms, or 1 to 4 carbon atoms.

The (meth)acrylate polymer can have any weight average molecular weight and any composition that allows dissolution in an organic solvent and that is miscible with the fluorinated polymer. Suitable (meth)acrylate polymers are usually amorphous or semi-crystalline. In many embodiments, the (meth)acrylate polymer is rubbery. The (meth)acrylate polymer can have any suitable molecular weight that allows dissolution in an organic solvent. At least at the time of deposition to form the reflective layer, the (meth)acrylate polymer is not crosslinked.

In some embodiments, the (meth)acrylate polymer is formed from a monomer mixture that includes methyl methacrylate. The (meth)acrylate polymer can be a homopolymer of methyl methacrylate (i.e., poly(methyl methacrylate)) or can be formed from a monomer mixture that contains methyl methacrylate plus at least one second monomer such as methyl acrylate, an alkyl (meth)acrylate having an alkyl group with 2 to 10 carbon atoms, (meth)acrylic acid, (meth)acrylonitrile, (meth)acrylamide, N,N-dialkyl (meth)acrylamide such as those having an alkyl group with 1 to 4 carbon atoms (e.g., N,N-dimethyl acrylamide and N,N-diethyl acrylamide), N,N-dialkylaminoethyl (meth)acrylate having an alkyl group with 1 to 4 carbon atoms (e.g., N,N-dimethylaminoethyl methacrylate), tetrahydrofuran (meth)acrylate, glycidyl (meth)acrylate, (meth)acrylic acid, styrene, and vinyl ethers.

In some more specific embodiments, the (meth)acrylate polymer is formed from a monomer mixture of methyl methacrylate and at least one second monomer that is an alkyl (meth)acrylate having an alkyl group with 2 to 10 carbon atoms (e.g., 2 to 6 carbon atoms or 2 to 4 carbon atoms), a (meth)acrylic acid, or a combination thereof. These monomers tend to result in the formation of (meth)acrylate polymers that can be formed into a film that is transparent (at least 70 percent, at least 75 percent, at least 80 percent, at least 85 percent, at least 90 percent, at least 95 percent, at least 97 percent, at least 98 percent, or at least 99 percent transparent) to light in the visible region of the electromagnetic spectrum (e.g., 400 nanometers to 700 nanometers).

The monomer mixtures used to form the (meth)acrylate polymer often contain at least 50 weight percent, at least 60 weight percent, at least 70 weight percent, at least 80 weight percent, at least 90 weight percent, at least 95 weight percent, at least 97 weight percent, or at least 99 weight percent methyl methacrylate. For example, the monomer mixture contains 50 to 100 weight percent methyl methacrylate and 0 to 50 weight percent of at least one second monomer. Some such monomer mixture can include 60 to 100 weight percent methyl methacrylate and 0 to 40 weight percent of at least one second monomer, 70 to 100 weight percent methyl methacrylate and 0 to 30 weight percent of at least one second monomer, 80 to 100 weight percent methyl methacrylate and 0 to 20 weight percent of at least one second monomer, or 90 to 100 weight percent methyl methacrylate and 0 to 10 percent of at least one second monomer. In many embodiments, the second monomer includes an alkyl (meth)acrylate having an alkyl group with 2 to 10 carbon atoms (e.g., 2 to 6 carbon atoms, or 2 to 4 carbon atoms), a (meth)acrylic acid, or a combination thereof.

Example (meth)acrylate polymers include those commercially available under the trade designation ELVACITE (e.g., ELVACITE 2008, 2009, 2010, 2013, 2014, 2016, 2021, 2028, and 2041) from Lucite International (Cordova, Tex., USA) and under the trade designation PARALOID from Dow Chemical Company (Midland, Mich., USA). ELVACITE 2013 is a terpolymer of methyl methacrylate, n-butyl methacrylate, and methacrylic acid. ELVACITE 2014 is a terpolymer of methyl methacrylate, 2-ethylhexyl acrylate, and methacrylic acid.

In many embodiments, the polymeric blend contains a blend of 5 to 75 weight percent fluorinated polymer and 25 to 95 weight percent (meth)acrylate polymer with the weight percent value based on the total weight of polymers in the polymeric blend. For example, the blend can include 5 to 70 weight percent fluorinated polymer and 30 to 95 weight percent (meth)acrylate polymer, 10 to 70 weight percent fluorinated polymer and 30 to 90 weight percent (meth)acrylate polymer, 20 to 70 weight percent fluorinated polymer and 30 to 80 weight percent (meth)acrylate polymer, 20 to 60 weight percent fluorinated polymer and 40 to 80 weight percent (meth)acrylate polymer, 20 to 55 weight percent fluorinated polymer and 45 to 80 weight percent (meth)acrylate polymer, or 25 to 50 weight percent fluorinated polymer and 50 to 75 weight percent (meth)acrylate polymer. In many embodiments, the fluorinated polymer and the (meth)acrylate polymer are the only polymers included in the polymeric blend.

For use in the formation of the reflective layer, the polymeric blend of the fluorinated polymer and the (meth)acrylate polymer are often dissolved in a suitable organic solvent to form a polymeric blend solution. Suitable organic solvents include, but are not limited to, various ketones (e.g., acetone, methyl ethyl ketone, methyl isobutyl ketone, and cyclohexanone), aromatic hydrocarbons (e.g., toluene and xylene), ethers (e.g., tetrahydrofuran and glycol ethers), and amides (e.g., dimethylformamide and N-dimethylacetamide). A mixture of organic solvents can be used.

The polymeric blend solution often has a percent solids in the range of 1 to 20 weight percent solids, 2 to 15 weight percent solids, or 3 to 10 weight percent solids. The polymeric blend solution is typically applied so that the thickness of the wet layer is in a range of 1 to 15 mils (1 mil is 0.001 inches or 0.00254 cm). In some embodiments, the wet layer has a thickness in a range of 0.5 to 20 mils, 0.5 to 15 mils, 1 to 15 mils, 1 to 10 mils, 2 to 10 mils, or 5 to 10 mils. When dried and/or cured, the polymeric blend in the reflective layer 130 is typically transparent (e.g., at least 70 percent, at least 75 percent, at least 80 percent, at least 85 percent, at least 90 percent, at least 95 percent, at least 97 percent, at least 98 percent, or at least 99 percent transparent) to light in the visible region of the electromagnetic spectrum (e.g., 400 nanometers to 700 nanometers). That is, the polymeric blend in the reflective layer does not adversely diminish the reflectivity of the reflective metal that is also present in the reflective layer.

A wide variety of materials and combinations of materials are suitable for the thermoplastic carrier layer 110 of FIG. 1. In some embodiments, the thermoplastic carrier layer 110 may be a single layer of thermoplastic material. In other embodiments, the thermoplastic carrier layer includes a first layer of thermoplastic material and a second layer (or multiple layers) of another type of thermoplastic material or any other suitable material. In these other embodiments, the thermoplastic carrier layer 110 may include a coating of thermoplastic material on the first major surface of a sheet. The sheet may include, for example, paper, a polymeric film, and the like and can function to support the thermoplastic material. Examples of useful thermoplastic materials that can be used include polyvinyl chloride, polysulfones, polyolefins such as polyethylene, polypropylene and polybutylene, polyesters, and the like.

The array of partially embedded transparent microspheres 120 can be assembled and embedded into the thermoplastic carrier layer 110 using any suitable method. In some embodiments, the thermoplastic carrier layer 110 can be heat softened for embedding the array of multiple microspheres. The array of microspheres 120 can be packed as closely as possible in a single layer, ideally in their closest (i.e., close packed) hexagonal arrangement, to achieve good retroreflective brightness. The array of microspheres 120 can be so arranged by any convenient application process, such as printing, screening, cascading, or hot rolling. Upon cooling, the thermoplastic carrier layer 110 can retain the transparent microspheres 120 in a desired arrangement.

The microspheres can be embedded, for example, in an amount up to about 70 percent of their diameter. In many embodiments, the microspheres are embedded in an amount up to 60 percent, up to 50 percent, up to 45 percent, up to 40 percent up to 35 percent, or up to 30 percent of their diameter. The depth to which the microspheres are embedded can be controlled by, for example, the heating temperature applied to the thermoplastic carrier layer, the time during which the thermoplastic carrier layer is softened, the composition of the thermoplastic carrier layer, and the thickness of the thermoplastic carrier layer. In some embodiments, the thermoplastic carrier layer 110 includes one or more backing layers (e.g., paper sheet) to support the thermoplastic carrier layer. Methods for partially embedding the microspheres in the thermoplastic carrier layer are further described, for example, in U.S. Pat. No. 5,976,669 (Fleming).

The transparent microspheres 120 function as optical elements in the retroreflective articles. The transparent microspheres 120 are often substantially spherical in shape in order to provide the most uniform and efficient retroreflection. The transparent microspheres 120 can be substantially transparent to minimize absorption of light so that a large percentage (e.g., at least 50 percent, at least 60 percent, at least 70 percent, at least 80 percent, at least 90 percent, or at least 95 percent) of the incident light (e.g., light in the visible region of the electromagnetic spectrum) can be reflected. The transparent microspheres 120 often are substantially colorless but may be tinted or colored in some other fashion provided the transparency is sufficiently high in the visible region of the electromagnetic spectrum.

The transparent microspheres 120 may be made from glass, a non-vitreous ceramic composition, or a synthetic resin. Glass and ceramic microspheres are particularly suitable because they tend to be harder and more durable than microspheres made from synthetic resins. Examples of microspheres that may be used in this disclosure are further described in U.S. Pat. No. 1,175,224 (Bleecker), U.S. Pat. No. 2,461,011 (Taylor et al.), U.S. Pat. No. 2,726,161 (Beck et al.), U.S. Pat. No. 2,842,446 (Beck et al.), U.S. Pat. No. 2,853,393 (Beck et al.), U.S. Pat. No. 2,870,030 (Stradley et al.), U.S. Pat. No. 2,939,797 (Rindone), U.S. Pat. No. 2,965,921 (Bland), U.S. Pat. No. 2,992,122 (Beck et al.), U.S. Pat. No. 3,468,681 (Jaupain), U.S. Pat. No. 3,946,130 (Tung et al.), U.S. Pat. No. 4,192,576 (Tung et al.), U.S. Pat. No. 4,367,919 (Tung et al.), U.S. Pat. No. 4,564,556 (Lange), U.S. Pat. No. 4,758,469 (Lange), U.S. Pat. No. 4,772,511 (Wood et al.), and U.S. Pat. No. 4,931,414 (Wood et al.).

The transparent microspheres 120 can have an average diameter in the range of, for example, about 30 to 200 micrometers. Microspheres smaller than this range tend to provide lower levels of retroreflection, and microspheres larger than this range may impart an undesirably rough texture to the appliqué or may undesirably reduce its flexibility. The transparent microspheres 120 can have a refractive index of about 1.7 to about 2.0, the range typically considered to be useful in exposed lens retroreflective products.

The reflective layer 130 contains a reflective metal such as an elemental metal or a metal alloy that is capable of specularly reflecting light. A variety of metals may be used to provide a specularly reflective metal layer. The metals can include, for example, aluminum, silver, chromium, gold, nickel, magnesium, and the like, in elemental form, and combinations thereof. Aluminum and silver are particularly suitable metals for use in a reflective layer from a performance standpoint. Aluminum and silver metals are desirable because they tend to provide relatively higher retroreflective brightness. The metal may be a continuous coating such as is produced by vacuum-deposition, vapor coating, chemical-deposition, or electroless plating. It is to be understood that in the case of aluminum and silver, some of the metal may be in the form of the metal oxide and/or hydroxide. The metal layer should be thick enough to reflect incoming light. Typically, the reflective metal layer is, for example, about 50 to 150 nanometers thick.

In some embodiments, the reflective layer such as, for example, a vapor coated aluminum layer may be porous. The pores may result from any source such as from polycrystalline structure with grains and grain boundaries or from microcracks (e.g., cracks having a dimension range from nanometers to micrometers) in the coating. In some embodiments, the reflective layer may have pores having a dimension, for example, from sub-nanometers to several tens nanometers.

The polymeric blend and the reflective metal are both within the reflective layer 130 but may not be uniformly distributed. To provide good retroreflectivity, the reflective metal is typically at least in the buried region 130b of the reflective layer 130. In many embodiments, the reflective metal is distributed at least somewhat uniformly in both the buried region 130b and in interstitial region 130i of the reflective layer 130. The polymeric blend may be distributed in both the buried region 130b and in the interstitial region 130i but may be more concentrated in the interstitial region 130i. Because the reflective metal is often porous, some of the polymeric blend may reside within the pores of the reflective metal. In some embodiments, the polymeric blend may be on a surface 132 of the reflective layer 130 within the interstitial region 130i that is opposite the bead bond layer 140.

A bead bond composition can be applied to the reflective layer 130 to form the bead bond layer 140. In some embodiments, the bead bond composition can include at least one bead bond polymer or prepolymer. If desired, and depending upon the nature of the bead bond composition, the bead bond composition may be polymerized, cured, dried, or any combination thereof to form the bead bond layer. For example, if the bead bond composition is a solvent-borne composition, the bead bond layer 140 can be dried to remove the solvent. Also, if the bead bond composition includes a prepolymer composition, that is to say that it contains elements that upon polymerization form the polymer components of bead bond layer, polymerization and/or curing of the bead bond composition can be carried out to form the polymeric components of the bead bond layer.

The bead bond layer 140 can completely cover the reflective metal layer 130. In some embodiments, the bead bond layer 140 can be 50 to 250 micrometers thick, or 50 to 150 micrometers thick. A wide range of polymeric materials are suitable for use in the bead bond layer 140. Examples of suitable polymeric materials for use in preparing the bead bond layer 140 include materials that contain functional groups such as urethanes, esters, ethers, ureas, epoxies, carbonates, (meth)acrylates, olefins, vinyl chlorides, amides, alkyds, and combinations thereof.

Particularly suitable polymers for used in the bead bond layer are phenol resole/rubber resins, crosslinked poly(urethane-ureas), and crosslinked poly(acrylates). Poly(urethane-ureas) may be formed by reacting a hydroxy-functional polyester resin with excess polyisocyanate. Alternatively, a polypropylene oxide diol may be reacted with a diisocyanate and then with a triamino-functionalized polypropylene oxide. Crosslinked poly(acrylates) may be formed by exposing acrylate oligomers to electron beam radiation such as is described, for example, in U.S. Pat. No. 5,283,101 (Li). Other materials are nitrile rubbers (e.g., copolymers of acrylonitrile and butadiene). Suitable polymers for the bead bond layer are further described in U.S. Pat. No. 5,976,669 (Fleming).

Examples of commercially available polymers that may be used in the bead bond layer 140 include: nitrile rubber copolymers commercially available from Zeon Chemicals (Louisville, Ky., USA) under the trade designation NIPOL NBR 1001LG; phenol resole resins such as those commercially available from SI Group, Inc. (Schenectady, N.Y., USA) under the trade designation BRJ-473; polyester resins from Bostick, Inc. (Middleton, Mass., USA) under the trade designation VITEL 3550B; an aliphatic urethane diacrylate is commercially available from Allnex (Smryna, Ga., USA) under the trade designation EBECRYL 230; and a polyether amine commercially available from Huntsman Corporation (Houston, Tex., USA) under the trade designation JEFFAMINE T-5000; and a polyether polyol commercially available from Bayer Material Science, LLC (Pittsburg, Pa., USA) under the trade designation ACCLAIM 8200.

The retroreflective article 200 may further include a variety of optional layers. Typically these optional layers are incorporated into the precursor article prior to removal of the thermoplastic carrier layer, but if desired, these optional layers can be incorporated into the retroreflective article after the removal of the thermoplastic carrier layer. In some embodiments, the final retroreflective article may further include a layer of adhesive disposed on the bead bond layer. This adhesive may be a pressure sensitive adhesive, a heat activated adhesive, or a curable adhesive such as a laminating adhesive. The adhesive layer may be applied to the bead bond layer by coating with an adhesive layer or by lamination of a previously formed adhesive layer. The adhesive layer may be covered by a release liner if desired, especially if the adhesive layer includes a pressure sensitive adhesive.

In some embodiments, the bead bond layer 140 may be adhered to a wide variety of substrates. The substrate may be, for example, the surface of a tire, the surface of a sign, or the surface of a piece of clothing. The substrate may include backing materials such as films, foams, or fabrics, or a variety of woven or nonwoven webs.

Figure 3:
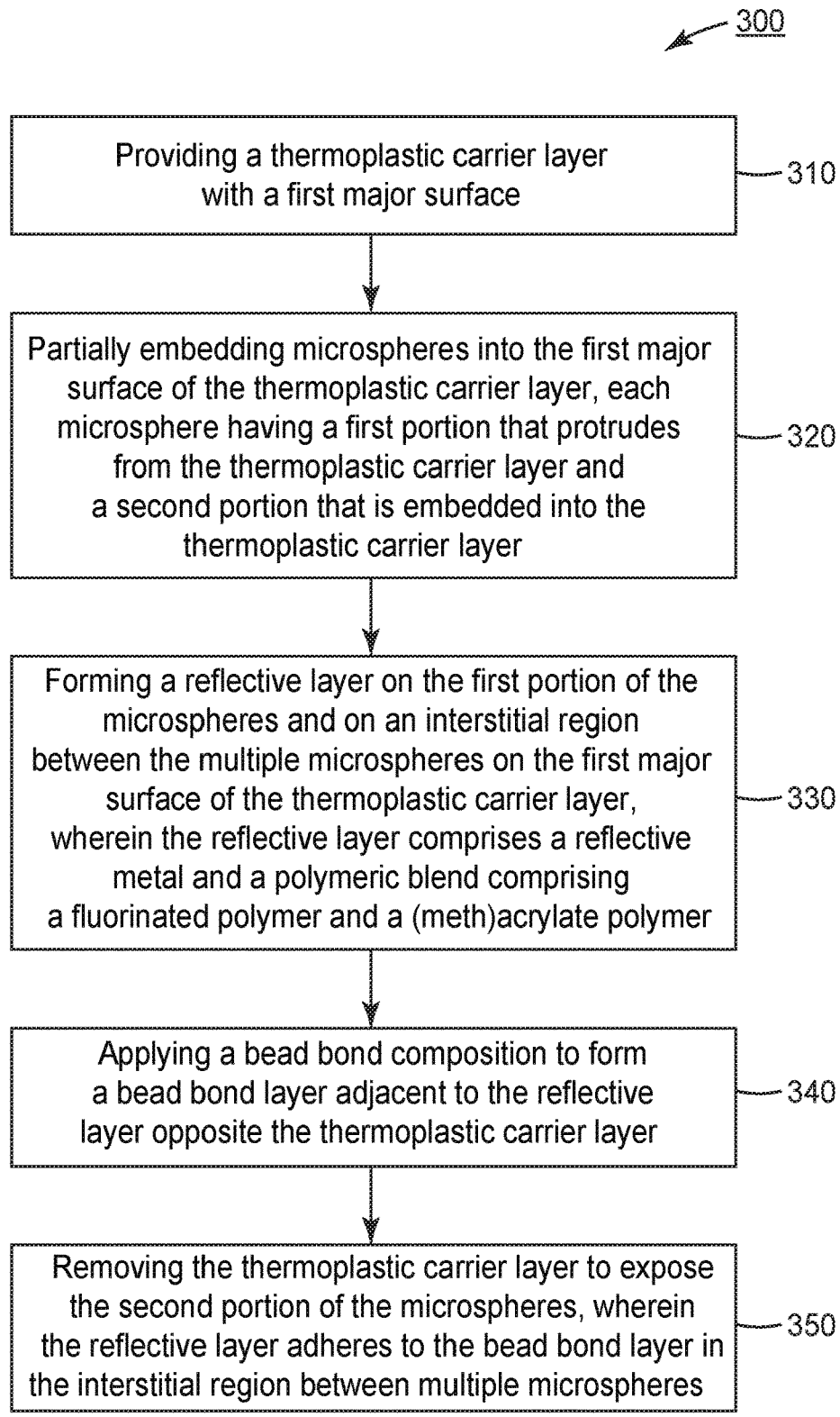
FIG. 3 is a schematic flow diagram of one embodiment of a method for preparing a retroreflective article.

Disclosed herein are methods of preparing precursor articles and retroreflective articles. FIG. 3 illustrates a flow diagram for one embodiment of a method 300 for preparing a retroreflective article with a strengthened reflective metal layer. At 310, a thermoplastic carrier layer 110 with the first major surface 112 (as shown in FIG. 1) is provided. The thermoplastic carrier layer can be a single layer of thermoplastic material or can contain a first layer of thermoplastic material and a second layer that can be a thermoplastic material or any other suitable material. In some embodiments, the second layer provides support for the thermoplastic material in the first layer. The first major surface 112 is a surface of the thermoplastic material in the thermoplastic carrier layer 110.

At 320 in FIG. 3, an array of multiple transparent microspheres such as the transparent microspheres 120 of FIG. 1 are partially embedded into the first major surface 112 of the thermoplastic carrier layer 110. The microspheres have a second portion 122 that are embedded into the first major surface 112 of the thermoplastic carrier layer 110 and an exposed first portion 121 protruding from the first major surface 112 of the thermoplastic carrier layer 110. The microspheres are typically arranged in a single layer and in a close packed configuration. The microspheres themselves are discussed above. The microspheres are typically embedded in the thermoplastic carrier layer to a depth up to 30 percent, up to 40 percent, up to 50 percent, up to 60 percent, or up to 70 percent based on the diameter of the microspheres. In some embodiments, the microsphere are embedded to a depth of 30 to 70 percent, 30 to 60 percent, 40 to 70 percent, or 40 to 60 percent. The extent to which the microspheres are embedded can be controlled, for example, by the thickness and composition of the thermoplastic material in the thermoplastic carrier layer, the heating temperature used for embedding, and the time during which the thermoplastic material is sufficiently soft to allow embedding. Methods for partially embedding the microspheres in the thermoplastic carrier layer are further described, for example, in U.S. Pat. No. 5,976,669 (Fleming).

At 330 in FIG. 3, a reflective layer 130 as shown in FIG. 1 is formed on the first portion 121 of the microspheres and on the interstitial region of the first major surface 112 of the thermoplastic carrier layer 110 between the multiple transparent microspheres (interstitial region 130*i*). The reflective layer includes a reflective metal and a polymeric blend including a fluorinated polymer and a (meth)acrylate polymer. The polymeric blend can be applied in various ways to strengthen the reflective layer 130, particularly in the interstitial region 130*i*. In one embodiment as described further below and in FIG. 4, the reflective layer 130 is formed by depositing the reflective metal and then the polymeric blend. In another embodiment as described further below and in FIG. 5, the polymeric blend is applied to the thermoplastic carrier layer 110 and the exposed portions of the transparent microspheres 120 prior to the deposition of the reflective metal layer thereon. After deposition of polymeric blend, the intermediate article is typically heated to dry and/or cure the polymeric blend included in the reflective layer. This heating and/or further heating involved in the formation of the bead bond layer may result in the concentration of the polymeric blend in the interstitial region 130*i* of the reflective layer. In particular, the surface 132 of the reflective layer 130 may be rich in the material of the polymeric blend in the interstitial region 130*i*.

At 340 in FIG. 3, a bead bond composition is applied onto the reflective layer 130 to form a bead bond layer 140 as shown in FIG. 1. The bead bond composition is often heated to form the bead bond layer. This heating is often for the purpose of curing and/or drying the bead bond composition. The bead bond layer is adjacent to the reflective layer opposite the thermoplastic carrier layer. A portion of the transparent microspheres (e.g., to a depth up to 70 percent, up to 60 percent, up to 50 percent, up to 40 percent, or up to 30 percent) and the buried region 130b of the reflective layer 130 are embedded into the bead bond layer. The bead bond layer contacts the reflective layer in an interstitial region 130i and in the buried region 130b of the reflective layer 130.

In some embodiments, one or more additional layer can be applied to the bead bond layer 140 opposite the thermoplastic carrier layer. Often, depending on the application of the retroreflective article, the one or more additional layers can include an adhesive layer or/or a fabric layer.

Step 340 in FIG. 3 results in the formation of a precursor article. At 350, a retroactive article is formed by removing the thermoplastic carrier layer to expose the second portion of the microspheres (the portion of the microspheres that were embedded in the thermoplastic carrier layer in step 320 in FIG. 3). The microspheres and the buried region of the reflective layer 130b of the reflective layer 130 remain embedded into the bead bond layer 140. The buried region 130b of the reflective layer 130 is positioned between the bead bond layer 140 and the transparent microspheres 120. Both the interstitial region 130i of the reflective layer 130 and the buried region 130b of the reflective layer 130 adheres to the bead bond layer 140 upon removal of the thermoplastic carrier layer.

In the method 300 shown in FIG. 3, the reflective layer is provided. The reflective layer is formed from both reflective metal and polymeric blend that includes both a fluorinated polymer and a (meth)acrylate polymer. Either the reflective metal can be deposited prior to the polymeric blend as shown in method 400 of FIG. 4 or the polymeric blend can be deposited prior to the reflective metal as shown in method 500 of FIG. 5.

Figure 4:
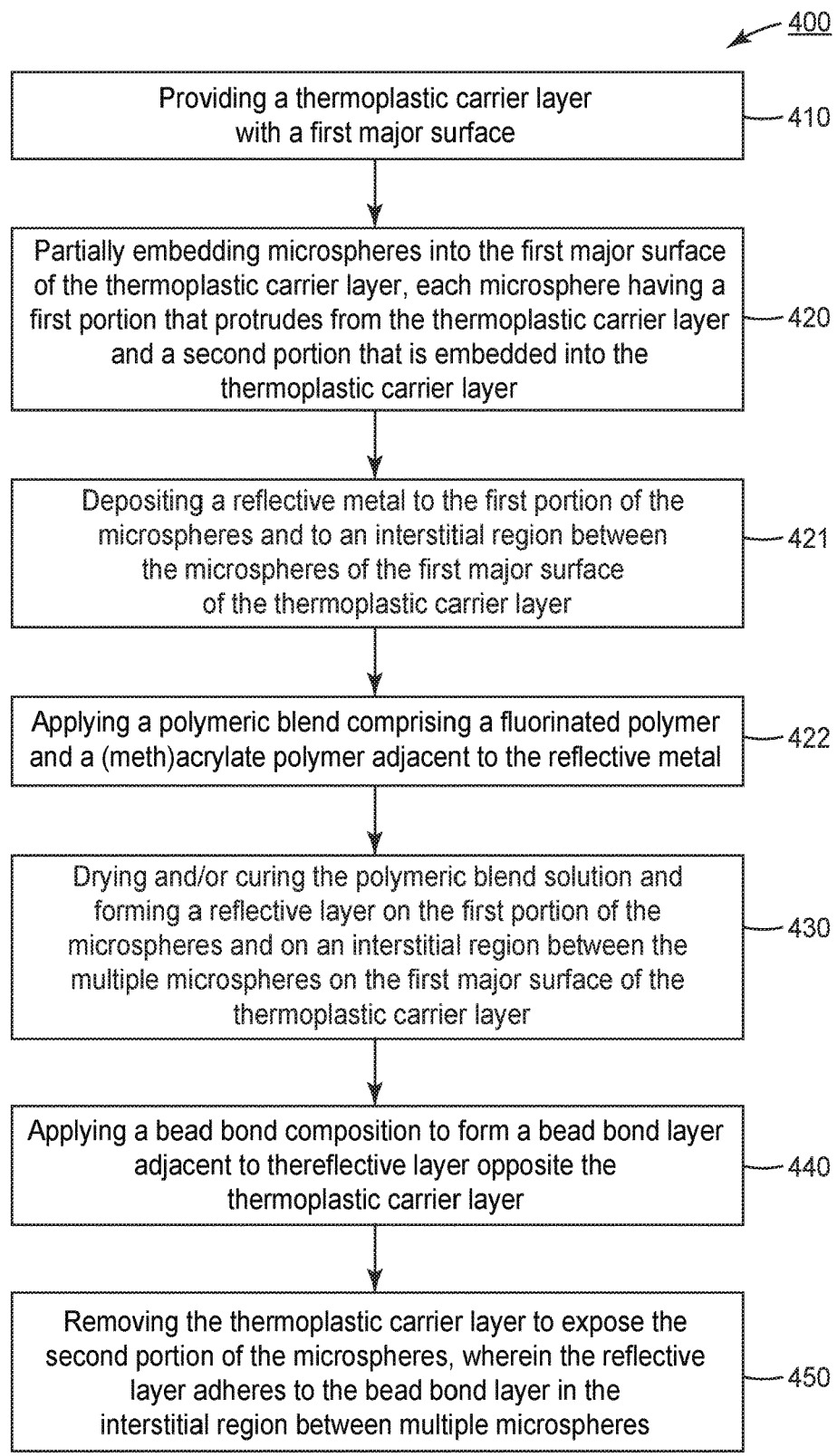
FIG. 4 is a schematic flow diagram of one embodiment of another method for preparing a retroreflective article.

FIG. 4 illustrates a flow diagram for one example method 400 of preparing a retroreflective article. At 410, a thermoplastic carrier layer 110 as shown in FIG. 1 is provided. The thermoplastic carrier layer 110 has a first major surface 112.

At 420 in FIG. 4, microspheres are partially embedded into the first major surface 112 of the thermoplastic carrier layer 110. The transparent microspheres 120 have a first portion 121 that protrudes from the thermoplastic carrier layer 110 and a second portion 122 that are embedded into the thermoplastic carrier layer 110.

At 421 in FIG. 4, a reflective metal is deposited on the first portion of the microspheres and to an interstitial region between the microspheres that are embedded into the thermoplastic carrier layer 110. That is, the reflective metal is deposited on the portion of the microspheres that protrude from the first major surface of the thermoplastic carrier layer 110 and on all regions of the first major surface 112 of the thermoplastic carrier layer 110 between the protruding microspheres.

At 422 in FIG. 4, a polymeric blend solution is applied to the reflective metal layer. The polymeric blend solution contains both the fluorinated polymer and the (meth)acrylate polymer dissolved in an organic solvent. The organic solvent included in the polymeric blend solution may be selected, for example, from various ketones (e.g., acetone, methyl ethyl ketone, methyl isobutyl ketone, and cyclohexanone), aromatic hydrocarbons (e.g., toluene and xylene), ethers (e.g., tetrahydrofuran and glycol ethers), and amides (e.g., dimethylformamide and N-dimethylacetamide). A mixture of organic solvents can be used.

The polymeric blend solution can be applied by a variety of methods including, for example, spraying, brushing, notch bar coating, dipping and the like. The polymeric blend solution often contains at least 0.1 weight percent solids. The solids are mainly the fluorinated polymer and the (meth) acrylate polymer. In some examples, the weight percent solids can be at least 0.5 weight percent or at least 1 weight percent. The weight percent solids can be up to 20 weight percent or higher depending on the viscosity of the polymeric blend solution. In some embodiments, the weight percent solids can be up to 15 weight percent, up to 10 weight percent, or up to 5 weight percent. The polymeric blend solution is applied at a thickness equal to at least 0.1 mils where 1 mil is 0.001 inches or 0.0025 centimeters. The thickness of the polymeric blend solution (prior to drying) is often in a range of 0.1 to 20 mils, in a range of 0.5 to 10 mils, or in a range of 1 to 5 mils.

At 430 in FIG. 4, the applied polymeric blend solution is cured and/or dried and a reflective layer 130 is formed on the first portion of the microspheres 121 and on the interstitial region between the multiple microspheres 120 on the first major surface of the thermoplastic carrier layer 110. This may be achieved at room temperature for a time sufficient to permit curing and/or drying, but typically the intermediate article is heated to effect curing and/or drying. The heating can occur in a variety of ways, such as by placing the intermediate article in an oven, or by exposing the applied polymeric blend solution to an infrared lamp, for example. In some embodiments, the intermediate article can be placed in an oven set at a temperature of, for example, from 50° C. to 130° C. for a time sufficient to cure and/or dry. The time is often, for example, about 10 minutes to 2 hours.

While not wishing to be bound by theory, it is believed that when the polymeric blend is applied to reflective metal layer and then the resulting intermediate article is heated, at least some of the polymeric blend is present at the surface 132 of the reflective layer 130 in the interstitial region 130i. In some embodiments, the reflective metal in the reflective layer 130 may include pores, and the polymeric blend can fill in the pores or migrate through the pores to the surface 132. Due to the fluid nature of the polymeric blend solution, the concentration of the polymeric blend may be higher in the interstitial region 130i than in the buried region 130b of the reflective layer 130.

In 440 in FIG. 4, a bead bond layer 140 is applied adjacent to the reflective layer 130. The bead bond layer is often applied as a bead bond composition that is subsequently dried and/or cured to form the bead bond layer 140. The bead bond layer 140 typically contacts the entire surface 134 of the reflective layer 130. The bead bond layer is often applied as a bead bond composition that is then either dried and/or cured. In some embodiments, the bead bond layer 140 can be dried or cured at a temperature of, for example, from 50° C. to 200° C. after being applied. The addition of the bead bond layer 140 results in the formation of a precursor article.

In 450 in FIG. 4, the thermoplastic carrier layer is removed to expose the second portion of the microspheres (the portion originally embedded in the thermoplastic carrier layer). The removal results in the reflective layer 130 adhering to the bead bond layer 140 in both the interstitial region 130i between the multiple microspheres 120 and in the buried region 130b between the transparent microspheres 120 and the bead bond layer 140.

The precursor article can immediately be subjected to step 450 and the removal of the thermoplastic carrier layer. Alternatively, the precursor article can be stored for later use, can be shipped to another location, or can be subjected to additional processing steps such as cutting, attachment to a substrate, and the like. In some embodiments, it is desirable to form the precursor article rather than the retroreflective article, because this precursor article can be stored, shipped, or processed without exposing the transparent microsphere layer. When the transparent microspheres are exposed, they may be subject to potential damage from abrasion, staining, and the like.

In both the precursor article formed in step 440 and in the retroreflective article formed in step 450 in FIG. 4, the polymeric blend is often present on the outer surface 132 of the reflective layer in the interstitial region 130i opposite the bead bond layer. The presence of the polymeric blend at the outer surface can provide protection for the interstitial regions 130i such that it is less susceptible to corrosion and/or staining. In some embodiments, the reflective metal in the reflective layer 130 may include pores, and the polymeric blend can fill in the pores or migrate through the pores to the surface 132. Due to the fluid nature of the polymeric blend solution, the concentration of the polymeric blend may be higher in the interstitial region 130i than in the buried region 130b of the reflective layer 130.

Figure 5:
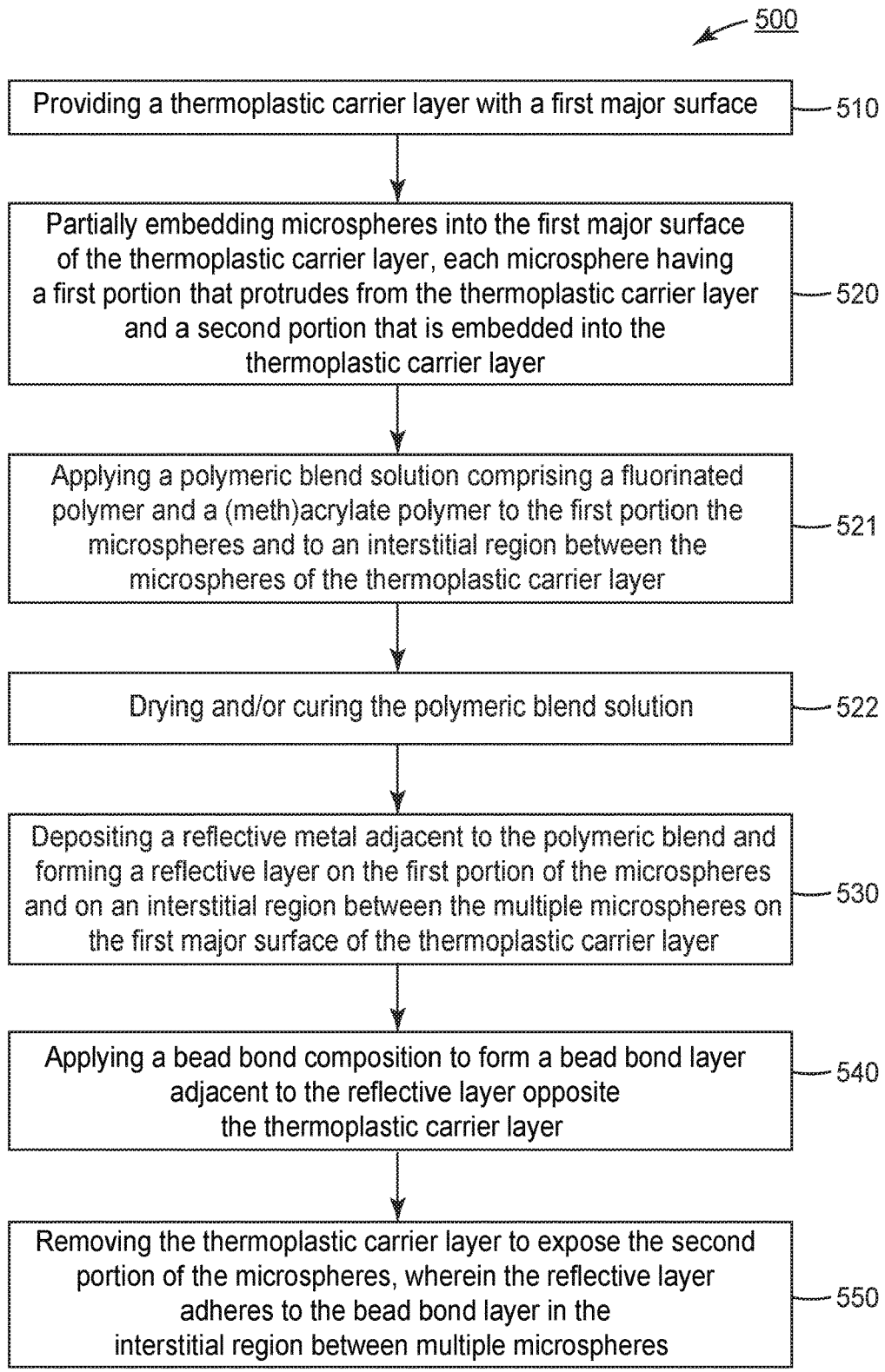
FIG. 5 is a schematic flow diagram of yet another embodiment of a method for preparing a retroreflective article.

FIG. 5 illustrates a flow diagram for another example method 500 of preparing a retroreflective article. Method 500 is similar to method 400 except that in method 500 the polymeric blend solution is applied prior to deposition of the reflective metal layer. The resulting retroreflective article formed using method 500 is expected to be similar or identical to the retroreflective articles formed using method 400.

Steps 510 and 520 of method 500 shown in FIG. 5 are similar to steps 410 and 420 of method 400 shown in FIG. 4.

At 521 of FIG. 5, a polymeric blend solution comprising a fluorinated polymer and a (meth)acrylate polymer dissolved in an organic solvent are applied to the first portion 121 of the transparent microspheres 120 and to an interstitial region between the microspheres embedded in the thermoplastic carrier layer 110. Suitable organic solvents are the same as those described above in method 400 of FIG. 4. The polymeric blend solution is applied at a thickness equal to at least 0.1 mils where 1 mil is 0.001 inches or 0.0025 centimeters. The thickness of the polymeric blend solution (prior to drying) is often in a range of 0.1 to 20 mils, in a range of 0.5 to 10 mils, or in a range of 1 to 5 mils.

At 522 of FIG. 5, the polymeric blend solution is permitted to dry and/or cure. This may be achieved at room temperature for a time sufficient to permit drying and/or curing, but typically the intermediate article is heated to effect drying and/or curing. The heating can occur in a variety of ways, such as by placing the intermediate article in an oven, or by exposing the applied polymeric blend solution to an infrared lamp, for example. In some embodiments, the intermediate article can be placed in an oven set at a temperature of, for example, from 50° C. to 130° C. for a time sufficient to cure and/or dry. The time is often, for example, about 10 minutes to 2 hours.

At 530, a reflective metal layer is deposited adjacent to the deposited polymeric blend and a reflective layer 130 is formed on the first portion of the microspheres 121 and on the interstitial region between the multiple microspheres 120 on the first major surface of the thermoplastic carrier layer 110. The reflective metal can be deposited by, for example, vacuum-deposition, vapor coating, chemical-deposition, or electrodeless plating. The reflective metal layer is provided adjacent to the polymeric blend to cover both the underlying first portion 121 of the transparent microspheres 120 and the underlying interstitial regions of the thermoplastic carrier layer between the transparent microspheres 120.

Steps 540 and 550 of method 500 shown in FIG. 5 are similar to steps 440 and 450 of method 400 shown in FIG. 4. In both the precursor article formed in step 540 and in the retroreflective article formed in step 550 in FIG. 5, the polymeric blend is often present on the outer surface 132 of the reflective layer in the interstitial region 130i opposite the bead bond layer. The presence of the polymeric blend at the outer surface can provide protection for the interstitial regions 130i such that it is less susceptible to corrosion and/or staining. In some embodiments, the reflective metal in the reflective layer 130 may include pores, and the polymeric blend can fill in the pores or migrate through the pores to the surface 132. Due to the fluid nature of the polymeric blend solution, the concentration of the polymeric blend may be higher in the interstitial region 130i than in the buried region 130b of the reflective layer 130.

The retroreflective articles of this disclosure can be incorporated into a wide variety of commercial articles to impart retroreflectivity to the commercial articles. Examples of suitable commercial articles include: display articles such as signs, billboards, pavement markings, and the like; transportation articles such as bicycles, motorcycles, trains, buses, and the like; and clothing articles such as shirts, sweaters, sweatshirts, jackets, coats, pants, shoes, socks, gloves, belts, hats, suits, one-piece body garments, vests, bags, and backpacks, and the like.

Various embodiments are provided that are retroreflective articles, precursors to the retroreflective articles, methods of making the retroreflective articles, and methods of making the precursor articles.

Embodiment 1 is an article that includes a bead bond layer, an array of multiple transparent microspheres, and a reflective layer containing a reflective metal and a polymeric blend comprising a fluorinated polymer and a (meth)acrylate polymer. The transparent microspheres in the array have a first portion that are embedded in a first major surface of the bead bond layer and a second portion protruding from the first major surface of the bead bond layer. The reflective layer has a buried region disposed between the bead bond layer and the first portion of the transparent microspheres, and an interstitial region disposed on the first major surface of the bead bond layer between the transparent microspheres.

Embodiment 2 is the article of embodiment 1, further comprising a thermoplastic carrier layer, wherein the second portion of the microspheres are embedded in the thermoplastic carrier layer.

Embodiment 3 is the article of embodiment 1 or 2, wherein the polymeric blend comprises 5 to 75 weight percent fluorinated polymer and 25 to 95 weight percent (meth)acrylate polymer based on a total weight of polymeric material in the polymeric blend.

Embodiment 4 is the article of embodiment 3, wherein the polymeric blend comprises 20 to 60 weight percent fluorinated polymer and 40 to 80 weight percent (meth)acrylate polymer based on a total weight of polymeric material in the polymeric blend.

Embodiment 5 is the article of any one of embodiments 1 to 4, wherein the fluorinated polymer is formed from at least one fluorinated monomer selected from vinylidene fluoride, tetrafluoroethylene, chlorotrifluoroethylene, monofluoroethylene, hexafluoropropylene, and a fluoroalkyl vinyl ethers having a fluoroalkyl group with 1 to 5 carbon atoms.

Embodiment 6 is the article of any one of embodiments 1 to 5, wherein the fluorinated polymer is poly(vinylidene fluoride) or is formed from a monomer composition comprising vinylidene fluoride and at least one second fluorinated monomer selected from tetrafluoroethylene, chlorotrifluoroethylene, monofluoroethylene, hexafluoropropylene, and a fluoroalkyl vinyl ethers having a fluoroalkyl group with 1 to 5 carbon atoms.

Embodiment 7 is the article of embodiment 6, wherein the fluorinated polymer is formed from a monomer mixture comprising 30 to 90 weight percent vinylidene fluoride and 10 to 70 weight percent of the at least one second fluorinated monomer based on a total weight of monomers in the monomer mixture.

Embodiment 8 is the article of any one of embodiments 1 to 7, wherein the (meth)acrylate polymer is poly(methyl methacrylate) or comprises a reaction product of a monomer mixture comprising methyl methacrylate and at least one second monomer that is an alkyl (meth)acrylate having an alkyl group with 2 to 10 carbon atoms, a (meth)acrylic acid, or a combination thereof.

Embodiment 9 is the article of any one of embodiments 1 to 8, wherein the concentration of the polymeric blend is greater in the interstitial region of the reflective layer than in the buried region of the reflective layer.

Embodiment 10 is the article of any one of embodiments 1 to 9, wherein the polymeric blend is at a surface of the interstitial region of the reflective layer that is opposite the bead bond layer.

Embodiment 11 is the article of any one of embodiments 1 to 10, wherein the reflective metal is porous.

Embodiment 12 is the article of any one of embodiments 1 to 11, wherein the reflective metal is aluminum or silver.

Embodiment 13 is the article of any one of embodiments 1 to 12, further comprising an adhesive layer positioned adjacent to a major surface of the bead bond layer opposite the reflective layer.

Embodiment 14 is the article of any one of embodiments 1 to 13, wherein a major surface of the bead bond layer opposite the reflective layer is adhered to a substrate.

Embodiment 15 is the article of any one of embodiments 1 to 14, wherein the microspheres have an average diameter in a range of 30 to 200 micrometers and have a refractive index of 1.7 to 2.0.

Embodiment 16 is the article of any one of embodiments 2 to 15, wherein the microspheres are embedded in the thermoplastic carrier layer to a depth up to 30 percent, up to 40 percent, up to 50 percent, up to 60 percent, or up to 70 percent of the diameter of the microspheres.

Embodiment 17 is the article of any one of embodiments 1 to 16, wherein the array of multiple transparent microspheres are in a single layer and in a close packed arrangement.

Embodiment 18 is a method of preparing a retroreflective article. The method includes providing a thermoplastic carrier layer having a first major surface. The method further includes partially embedding an array of multiple transparent microspheres into the first major surface of the thermoplastic carrier layer, wherein the transparent microspheres have a first portion that protrudes from the thermoplastic carrier layer and a second portion that is embedded into the thermoplastic carrier layer. The method still further includes providing a reflective layer on the first portion of the transparent microspheres and on an interstitial region of the first major surface of the thermoplastic carrier layer between the multiple transparent microspheres, wherein the reflective layer comprises a reflective metal and a polymeric blend comprising a fluorinated polymer and a (meth)acrylate polymer. Additionally, the method includes applying a bead bond composition to form a bead bond layer adjacent to the reflective layer opposite the thermoplastic carrier layer, wherein the first portion of the transparent microspheres and a buried region of the reflective layer that is on the first portion of the transparent microspheres are embedded into the bead bond layer and wherein the bead bond layer adheres to an interstitial region of the reflective layer between the multiple transparent microspheres. In some embodiments, the method further includes removing the thermoplastic carrier layer, wherein both the buried region and the interstitial region of the reflective layer remains attached to the bead bond layer.

Embodiment 19 is the method of embodiment 18, further comprising removing the thermoplastic carrier layer to expose the second portion of the microspheres, wherein both the buried region and the interstitial region of the reflective layer remain attached to the bead bond layer.

Embodiment 20 is the method of embodiment 18 or 19, wherein providing the reflective layer comprises depositing a layer of the reflective metal and then applying a polymeric blend to the layer of the reflective metal.

Embodiment 21 is the method of any one of embodiments 18 or 19, wherein providing the reflective layer comprises applying a polymeric blend and then depositing a layer of the reflective metal on the polymeric blend.

Embodiment 22 is the method of embodiment 20 or 21, wherein applying the polymeric blend comprising preparing a polymeric blend solution, applying the polymeric blend solution, and curing and/or drying the polymeric blend solution, wherein the polymeric blend solution comprises the fluorinated polymer, the (meth)acrylate polymer, and an organic solvent that dissolves both the fluorinated polymer and the (meth)acrylate polymer.

Embodiment 23 is the method of any one of embodiments 18 to 22, wherein the polymeric blend is at a surface of the interstitial region of the reflective layer that is opposite the bead bond layer.

Embodiment 24 is the method of any one of embodiments 18 to 23, wherein the polymeric blend comprises 5 to 75 weight percent fluorinated polymer and 25 to 95 weight percent (meth)acrylate polymer based on a total weight of polymeric material in the polymeric blend.

Embodiment 25 is the method of embodiment 24, wherein the polymeric blend comprises 20 to 60 weight percent fluorinated polymer and 40 to 80 weight percent (meth)acrylate polymer based on a total weight of polymeric material in the polymeric blend.

Embodiment 26 is the method of any one of embodiments 18 to 25, wherein the fluorinated polymer is formed from at least one fluorinated monomer selected from vinylidene fluoride, tetrafluoroethylene, chlorotrifluoroethylene, monofluoroethylene, hexafluoropropylene, and a fluoroalkyl vinyl ethers having a fluoroalkyl group with 1 to 5 carbon atoms.

Embodiment 27 is the method of any one of embodiments 18 to 26, wherein the fluorinated polymer is poly(vinylidene fluoride) or is formed from a monomer composition comprising vinylidene fluoride and at least one second fluorinated monomer selected from tetrafluoroethylene, chlorotrifluoroethylene, monofluoroethylene, hexafluoropropylene, and a fluoroalkyl vinyl ethers having a fluoroalkyl group with 1 to 5 carbon atoms.

Embodiment 28 is the method of embodiment 27, wherein the fluorinated polymer is formed from a monomer mixture comprising 30 to 90 weight percent vinylidene fluoride and 10 to 70 weight percent of the at least one second fluorinated monomer based on a total weight of monomers in the monomer mixture.

Embodiment 29 is the method of any one of embodiments 18 to 28, wherein the (meth)acrylate polymer is poly(methyl methacrylate) or comprises a reaction product of a monomer mixture comprising methyl methacrylate and at least one second monomer that is an alkyl (meth)acrylate having an alkyl group with 2 to 10 carbon atoms, a (meth)acrylic acid, or a combination thereof.

Embodiment 30 is the method of any one of embodiments 18 to 29, wherein the concentration of the polymeric blend is greater in the interstitial region of the reflective layer than in the buried region of the reflective layer.

Embodiment 31 is the article of any one of embodiments 18 to 30, wherein the polymeric blend is at a surface of the interstitial region of the reflective layer that is opposite the bead bond layer.

Embodiment 32 is the method of any one of embodiments 18 to 31, wherein the reflective metal is porous.

Embodiment 33 is the method of any one of embodiments 18 to 32, wherein the reflective metal is aluminum or silver.

Embodiment 34 is the method of any one of embodiments 18 to 33, further comprising positioning an adhesive layer adjacent to a major surface of the bead bond layer opposite the reflective layer.

Embodiment 35 is the method of any one of embodiments 18 to 34, further comprising adhering a substrate to a major surface of the bead bond layer opposite the reflective layer.

Embodiment 36 is the method of any one of embodiments 18 to 35, wherein method further comprising heating after applying the bead bond composition.

EXAMPLES

These examples are merely for illustrative purposes and are not meant to be limiting on the scope of the appended claims. All parts, percentages, ratios, etc. in the examples and the rest of the specification are by weight, unless noted otherwise. The following abbreviations are used: "cm" refers to centimeters; "in" refers to inches, "oz/sy" refers to ounces per square yard and "RH" refers to Relative Humidity.

Table of Abbreviations

| Abbreviation | Description |
| --- | --- |
| Bead Bond | Bead bond layer material is a 28 weight percent solids blend of a mixture of acrylonitrile butadiene rubber and a phenol-cresol resole resin solution. The acrylonitrile butadiene rubber is commercially available from Zeon Chemicals (Louisville, KY, USA) under the trade designation NIPOL NBR 1001G. The phenol-cresol resin solution, which is prepared in either methyl ethyl ketone or methyl isobutyl ketone, is commercially available from SI Group, Inc. (Schenectady, NY, USA) under the trade designation BRJ-473. |
| Film Adhesive | Adhesive film commercially available from Bemis Associates (Shirley, MA, USA) under the trade designation ADHESIVE FILM 3287. |
| Fabric | 3.1 oz/sy fabric containing 65 weight percent polyester and 35 weight percent cotton that is commercially available from Springs Industries (Rock Hill, SC, USA). |

Test Methods:
Analytical Test

The surfaces of samples of retroreflective sheeting were analyzed by time-of-flight secondary ion mass spectrometry (TOF-SIMS), using an instrument available from ION-TOF Gmbh (Münster, Germany) under the trade designation TOF.SIMS. High mass-resolution positive and negative ion analyses were performed using a pulsed 25 keV Bi+ primary ion beam, with a beam diameter of about 3 micrometers, and an analysis area of 250 micrometers×250 micrometers. Post-acquisition mass resolution improvement methods may have been applied to some or all of the data. SIMS has monolayer sensitivity to atoms and molecules, with an analysis depth in the range of 1 to 2 nm (nanometers). In addition to obtaining high mass-resolution spectra, the sample surfaces were analyzed using the high-resolution imaging mode of the SIMS instrument. This operating mode sacrifices mass resolution but reduces the beam diameter to less than 1 micrometer (μm).

Stain Test

Samples of retroreflective sheeting (i.e., retroreflective articles) were tested for staining properties by placing 1 drop of a series of test solutions (listed below) on different locations of the reflective side of the sheeting and allowing the drops of solution to dry overnight. Alternatively, similar samples were tested for staining properties by applying human sweat onto the reflective side of the sheeting. The test samples were then placed in a constant temperature and humidity chamber set to 32° C./90 percent RH for approximately 60 hours, after which time the test samples were removed from the chamber, rinsed with deionized water, and dried. Staining properties were determined by observing whether the area that was thus tested produces an observable stain. The results are reported as "Stain" if staining was observed or "No Stain" if no staining was observed.

Stain Test Solutions pH 4.00 Buffer Solution: potassium acid phthalate;
pH 6.00 Buffer Solution: citric acid/sodium hydroxide solution;
pH 7.00 Buffer Solution: dibasic sodium phosphate, monobasic potassium phosphate;
pH 8.00 Buffer Solution: dibasic sodium phosphate, monobasic potassium phosphate;
Artificial Sweat: Stabilized Eccrine commercially available from Pickering Laboratories, Mountain View, Calif., USA; and
Human Sweat: Obtained from a subject's forehead area after aerobic exercising.

Example 1

Glass microspheres having an average diameter of about 40 to 90 micrometers were partially embedded in a thermoplastic carrier layer having a thickness of about 30 micrometers. The thermoplastic carrier layer contained juxtaposed paper and polyethylene layers, and the glass microspheres were embedded in the polyethylene layer.

A specularly reflective aluminum layer with a thickness of about 80 nanometers was vapor deposited, via a standard vapor coating process, over the thermoplastic carrier layer and the protruding portions of the glass microspheres to form a monolayer of reflective aluminum. After the reflective aluminum layer was vapor deposited, a polymeric blend solution was coated onto the surface of the reflective aluminum layer on the side opposite to the thermoplastic carrier layer. The polymeric blend solution was a 3 percent (by weight) solids solution formed by dissolving in methyl ethyl ketone a 50:50 (by weight) blend of a fluorinated polymer commercially available from 3M (Saint Paul, Minn., USA)

under the trade designation KEL-F 3700, and (meth)acrylate polymer commercially available from Lucite International (Cordova, Tex., USA) under the trade designation ELVACITE 2013. The polymeric blend solution was coated onto a 38.1 cm×30.5 cm (15 in×12 in) sheet of the intermediate article using a lab scale notch bar coater set to about 76.2 micrometers (3 mils) gap. It was followed by heating in an oven at 66° C. for 2 minutes and then at 149° C. for 2.0 minutes.

The bead bond layer was then coated onto the reflective layer using a lab scale notch bar coater set to about 177.8 micrometers (7 mils) gap. The coating step was followed by heating in an oven at 66° C. for 2.5 minutes and then at 166° C. for 6.0 minutes.

To the bead bond side of the sheet, an adhesive film of the same size was laminated with a platen laminator. The temperature was set to 177° C. The resulting transfer film was cut into 2.5 in×6 in long coupons and laminated onto Fabric. The thermoplastic carrier layers of the coupons were removed. The reflective layer in the interstitial region between the microspheres remained adhered to the bead bond layer.

Example 2

In the same manner as in Example 1, glass microspheres having an average diameter of about 40 to 90 micrometers were partially embedded in a thermoplastic carrier layer having a thickness of about 30 micrometers. The thermoplastic carrier layer contained juxtaposed paper and polyethylene layers, and the glass microspheres were embedded in the polyethylene layer.

Prior to deposition of a reflective aluminum layer over the thermoplastic carrier layer and the protruding portions of the glass microspheres, a polymeric blend solution was coated onto the surface of thermoplastic carrier layer having the partially embedded glass microspheres. The polymeric blend solution was a 3 percent (by weight) solids solution formed by dissolving in methyl ethyl ketone a 25:75 (by weight) blend of fluorinated polymer commercially available from 3M (Saint Paul, Minn., USA) under the trade designation KEL-F 3700, and the (meth)acrylate polymer commercially available from Lucite International (Cordova, Tex., USA) under the trade designation ELVACITE 2014. The polymeric blend solution was coated onto a 38.1 cm×30.5 cm (15 in×12 in) sheet using a lab scale notch bar coater set to about 76.2 micrometers (3 mils) gap. It was followed by heating in an oven at 66° C. for 2 minutes and then at 149° C. for 2.0 minutes. A specularly reflective aluminum layer was then vapor deposited, via a standard vapor coating process, over the thermoplastic carrier layer and the protruding portions of the glass microspheres that were treated with the polymeric blend solution to form a monolayer of retroreflective elements.

The bead bond layer was then coated onto the aluminum layer using a lab scale notch bar coater set to about 177.8 micrometers (7 mil) gap. It was followed by heating in an oven at 66° C. for 2.5 minutes and then at 166° C. for 6.0 minutes. To the bead bond side of the sheet, an Adhesive film of the same size was laminated with a platen laminator. The temperature was set to 177° C. The resulting transfer film was cut into 2.5 in×6 in long coupons and laminated onto Fabric. The thermoplastic carrier layers of the coupons were removed.

Comparative Example 1

Identical 2.5 in×6 in coupons were prepared by the same process as in Examples 1 and 2, but were not treated with the polymeric blend solution. That is, the reflective layer contained only aluminum and not the polymeric blend of a fluorinated polymer and a (meth)acrylate polymer.

Characterization of Example 1, Example 2, and Comparative Example C1

Figure 6A:
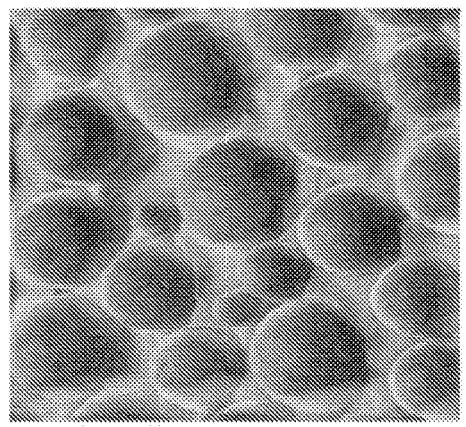
FIG. 6A-C illustrate lateral surface element distributions for Example 1, Example 2, and the Comparative Example C1, respectively.
Figure 6B:
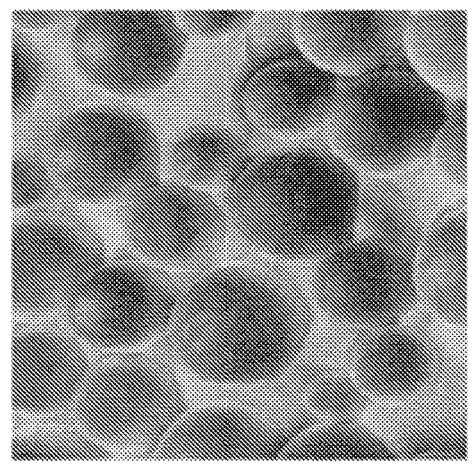
Figure 6C:
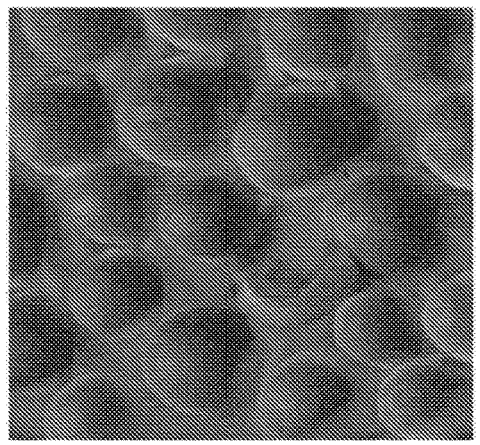

The Examples and Comparative Example were analyzed using the SIMS method described above and were tested using the Stain Test method described above. The SIMS results are shown in FIGS. 6A-C. The results of the Stain Test are shown in Table 1 below.

TABLE 1

| Test Solution | Example 1 | Example 2 | C1 |
|---|---|---|---|
| *$R_A$ | 530 | 530 | 533 |
| Human Sweat | 2 | 1 | 5 |
| Artificial Sweat | 0 | 1 | 2 |
| pH 4.00 Buffer Solution | 1 | 1 | 1 |
| pH 6.00 Buffer Solution | 0 | 0 | 1 |
| pH 7.00 Buffer Solution | 1 | 2 | 3 |
| pH 8.00 Buffer Solution | 0 | 2 | 3 |

*$R_A$ = Coefficient of Retroreflectivity; Staining Scale: 0 to 5 with 0 being no stain and 5 being severe stain.

FIGS. 6A-C illustrate lateral surface distributions of ion F (in red) and ion O or OH (in green) for Example 1, Example 2, and the Comparative Example C1, respectively. SIMS analysis of Examples 1 and 2 surfaces clearly shows a significant coating of fluoropolymer blend in the interstitial regions and on the sides of some of the protruded glass microspheres adjacent to the interstitial regions (see FIGS. 6A and 6B where the relatively dark regions represent the protruded glass microspheres without the fluoropolymer blend). The presence of fluorinated polymer was also verified using a pattern of multiple fragment ions characteristic of the material. An aluminum related signal is absent from the spectra of the surfaces shown in FIGS. 6A and 6B, suggesting that interstitial Aluminum regions are substantially covered by the coating of the polymeric blend for Examples 1 and 2. A fluoride ion related signal is absent from the surface of the Comparative Example C1 shown in FIG. 6C.

What is claimed is:

1. An article comprising:
   a bead bond layer;
   an array of multiple transparent microspheres, wherein the multiple transparent microspheres have a first portion that are embedded in a first major surface of the bead bond layer and a second portion protruding from the first major surface of the bead bond layer; and
   a reflective layer having a buried region disposed between the bead bond layer and the first portion of the transparent microspheres, and an interstitial region disposed on the first major surface of the bead bond layer between the transparent microspheres, wherein the reflective layer comprises a reflective metal and a polymeric blend comprising (a) a fluorinated polymer and (b) a (meth)acrylate polymer.

2. The article of claim 1, further comprising a thermoplastic carrier layer, wherein the second portion of the microspheres are embedded in the thermoplastic carrier layer.

3. The article of claim 1, wherein the polymeric blend comprises 5 to 75 weight percent fluorinated polymer and 25 to 95 weight percent (meth)acrylate polymer based on a total weight of polymeric material in the polymeric blend.

4. The article of claim 1, wherein the fluorinated polymer is formed from at least one fluorinated monomer selected from vinylidene fluoride, tetrafluoroethylene, chlorotrifluoroethylene, monofluoroethylene, hexafluoropropylene, and a fluoroalkyl vinyl ethers having a fluoroalkyl group with 1 to 5 carbon atoms.

5. The article of claim 1, wherein the fluorinated polymer is poly(vinlidene fluoride) or is formed from a monomer composition comprising vinylidene fluoride and at least one second fluorinated monomer selected from tetrafluoroethylene, chlorotrifluoroethylene, monofluoroethylene, hexafluoropropylene, and a fluoroalkyl vinyl ethers having a fluoroalkyl group with 1 to 5 carbon atoms.

6. The article of claim 1, wherein the (meth)acrylate polymer is poly(methyl methacrylate) or is formed from a monomer composition comprising methyl methacrylate and at least one second monomer that is an alkyl (meth)acrylate having an alkyl group with 2 to 10 carbon atoms, a (meth) acrylic acid, or a combination thereof.

7. The article of claim 1, wherein the concentration of the polymeric blend is greater in the interstitial region of the reflective layer than in the buried region of the reflective layer.

8. The article of claim 7, wherein the polymeric blend is at a surface of the interstitial region of the reflective layer that is opposite the bead bond layer.

9. The article of claim 1, wherein the reflective metal is porous.

10. The article of claim 1, further comprising an adhesive layer positioned adjacent to a major surface of the bead bond layer opposite the reflective layer.

11. A method of preparing a retroreflective article, the method comprising:
providing a thermoplastic carrier layer with a first major surface;
partially embedding an array of multiple transparent microspheres into the first major surface of the thermoplastic carrier layer, wherein the multiple transparent microspheres have a first portion that protrudes from the thermoplastic carrier layer and a second portion that are embedded into the thermoplastic carrier layer;
providing a reflective layer on the first portion of the transparent microspheres and on an interstitial region of the first major surface of the thermoplastic carrier layer between the multiple transparent microspheres, wherein the reflective layer comprises a reflective metal and a polymeric blend comprising (a) a fluorinated polymer and (b) a (meth)acrylate polymer; and
applying a bead bond composition to form a bead bond layer adjacent to the reflective layer opposite the thermoplastic carrier layer, wherein the first portion of the transparent microspheres and a buried region of the reflective layer that is on the first portion of the transparent microspheres are embedded into the bead bond layer and wherein the bead bond layer adheres to an interstitial region of the reflective layer between the multiple transparent microspheres.

12. The method of claim 11, further comprising removing the thermoplastic carrier layer to expose the second portion of the microspheres, wherein both the buried region and the interstitial region of the reflective layer remain attached to the bead bond layer.

13. The method of claim 11, wherein providing the reflective layer comprises depositing a layer of the reflective metal and then applying the polymeric blend to the layer of the reflective metal.

14. The method of claims 11, wherein providing the reflective layer comprises applying the polymeric blend on the first major surface of the thermoplastic carrier layer and then depositing a layer of the reflective metal on the polymeric blend.

15. The method of claim 13, wherein applying the polymeric blend comprising preparing a polymeric blend solution and applying the polymeric blend solution, the polymeric blend solution comprising the fluorinated polymer, the (meth)acrylate polymer, and an optional organic solvent that dissolves both the fluorinated polymer and the (meth)acrylate polymer.

16. The method of claim 12, wherein the polymeric blend is at a surface of the interstitial region of the reflective layer that is opposite the bead bond layer.

17. The method of claim 11, wherein the concentration of the polymeric blend is greater in the interstitial region of the reflective layer than in the buried region of the reflective layer.

18. The method of claim 11, wherein providing the reflective layer further comprises providing the polymeric blend to the reflective metal and heating the polymeric blend included in the reflective layer.

* * * * *